United States Patent
Bekiarian et al.

(10) Patent No.: US 8,987,369 B2
(45) Date of Patent: Mar. 24, 2015

(54) ACRYLIC ACID POLYMER NANOCOMPOSITES FROM AMINOSILANE-MODIFIED COLLOIDAL SILICA

(75) Inventors: Paul Gregory Bekiarian, Wilmington, DE (US); Gregory Scott Blackman, Media, PA (US); Gordon Mark Cohen, Wynnewood, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 14/004,705

(22) PCT Filed: Jun. 30, 2011

(86) PCT No.: PCT/US2011/042470
§ 371 (c)(1),
(2), (4) Date: Sep. 12, 2013

(87) PCT Pub. No.: WO2012/138364
PCT Pub. Date: Oct. 11, 2012

(65) Prior Publication Data
US 2014/0005313 A1    Jan. 2, 2014

Related U.S. Application Data

(60) Provisional application No. 61/471,841, filed on Apr. 5, 2011.

(51) Int. Cl.
C08L 33/02 (2006.01)
B32B 5/16 (2006.01)
C08K 9/06 (2006.01)
C09C 1/30 (2006.01)

(52) U.S. Cl.
CPC ............... C08K 9/06 (2013.01); C09C 1/3081 (2013.01); *Y10S 977/778* (2013.01); *Y10S 977/779* (2013.01); *Y10S 977/783* (2013.01)
USPC ........... 524/506; 428/403; 428/404; 428/405; 524/284; 524/300; 524/301; 977/778; 977/779; 977/783

(58) Field of Classification Search
None
See application file for complete search history.

(56) References Cited

U.S. PATENT DOCUMENTS 8,242,204 B2 * 8/2012 Kwag et al. ................ 524/560
2008/0087314 A1 * 4/2008 Xiao et al. ................. 136/201
2008/0216709 A1   9/2008 Steingrover et al.

FOREIGN PATENT DOCUMENTS

| EP | 1894888 A1 | 3/2008 |
| JP | 2008105919 | * 5/2008 |
| WO | 2005019195 A2 | 3/2005 |
| WO | 2007050462 A2 | 5/2007 |
| WO | 2008033988 A1 | 3/2008 |
| WO | 2009094023 A1 | 7/2009 |
| WO | 2012138363 A1 | 10/2012 |

OTHER PUBLICATIONS

Abstract for the article entitled "Composite Nanospheres of PAA/silica Controlled by Anionic Polymer" authored by Li et al. and published in Gaodeng Xuexiao Huaxue Xuebao (2009) 30(12), 2487-2490.*
Abstract for Chinese Patent Document No. 101089055.*
"Effect of Acrylic Polymer an Nanocomposite with Nano SiO2 on ThermaL Degradation and Fire Resistance of APP-DMER-MEL Coating" authored by Wang et al. and published in Polymer Degradation and Stability (2006) 1937-1947.*
Machine translation of JP 2008-105919 in English (no date).*
"Three Steps to Organic-inorganic Hybrid Films Showing Superhydrophilic Properties" authored by Celia et al. and published in Soft Matter (2011) 7, 10,057-10,062.*
"Surface Modification of Poly(ethylene-co-acrylic acid) with Amino-functionalized Silica Nanoparticles" authored by Scaffaro et al. and published in Journal of Materials Chemistry (2011) 21, 3849-3857.*
Abstract for CN 102181021 (Sep. 2011).*
Abstract for CN 1654533 (Aug. 2005).*
Non-Final Office Action, dated Aug. 21, 2014, U.S. Appl. No. 14/004,695.
International Search Report and Written Opinion, dated Dec. 1, 2011, International Application No. PCT/US2011/042469.
International Preliminary Report on Patentability Cover Sheet, dated Oct. 17, 2013, International Application No. PCT/US2011/042469.
International Preliminary Report on Patentability, International Application No. PCT/US2011/042469.

* cited by examiner

*Primary Examiner* — Marc Zimmer

(57) ABSTRACT

This invention relates to compositions comprising blends of acrylic add polymers and/or ethylene acrylic add copolymers and colloidal silica modified with certain aromatic aminosilanes, aromatic aminoalkylsilanes, alkenyl aminoalkylsilanes, secondary or tertiary aliphatic aminosilanes. These compositions can provide improved properties such loss modulus, storage modulus, creep resistance, and wear resistance, without sacrificing optical clarity.

11 Claims, No Drawings

ACRYLIC ACID POLYMER NANOCOMPOSITES FROM AMINOSILANE-MODIFIED COLLOIDAL SILICA

This application claims priority to Provisional Application No. 61/471841 filed Apr. 5, 2011 which is herein incorporated by reference.

FIELD OF THE INVENTION

This invention relates to nanocomposites comprising blends of acrylic acid polymers and aminosilane-modified colloidal silica.

BACKGROUND

Conventional filled polymer systems often have improved modulus, stiffness, and hardness relative to unfilled polymer systems. Use of nanofillers in polymers can improve the creep-resistance, wear-resistance, and modulus of the nanocomposite, without adversely affecting polymer aesthetics like clarity. Nanoparticles can also have a strong influence on the glass transition temperature (Tg) of polymers.

Although the high surface area of nanoparticles creates a large interface with host polymers, this high surface area also makes nanoparticles more prone to forming larger particles through agglomeration (a potentially reversible self-association that is frequently difficult and/or costly to reverse) or aggregation (an irreversible self-association). Agglomerated and aggregated nanoparticles frequently do not offer the level of benefits afforded by well-dispersed primary nanoparticles because they have less surface area in contact with the polymer matrix.

Colloidal silica is a potentially convenient source of nanoparticles (particles that are 100 nm in diameter or smaller) that might be blended with a polymer to improve various physical properties of the polymer. But colloidal silica can be difficult to disperse in solvents or polymers because the polar silanol groups on the surface of the nanoparticles can cause them to agglomerate. Even worse, the silanols can react chemically with each other ("condense") and form irreversible linkages that cause the particles to irreversibly aggregate.

Attempts to overcome this tendency to agglomerate have included grafting polystyrene "brushes" onto the silica nanoparticle surface, but these modified particles are useful only for blends of polymers of the same s composition as the brushes, namely polystyrene. In addition, this approach uses an expensive multistep, reversible addition-fragmentation chain transfer polymerization process, with smelly sulfur reagents, to modify the surface.

Silanes can also be used to modify silica surfaces like glass, glass lo fibers, and fumed silica (aggregates of silica nanoparticles), but is rarely used with primary, unaggregated silica particles. Phenylsilane modification improves the compatibility and dispersibility of silica nanoparticles in non-polar aromatic polymers such as polystyrene. Similarly, perfluoroalkylethylsilanes can be used for fluoropolymers.

In colloidal silica (unaggregated silica nanoparticles suspended in a liquid medium), surface modification is not as facile as it is with glass or aggregated particles. It can adversely affect the stability of the nanoparticles and cause them to agglomerate or irreversibly aggregate, which leads to particle clusters that are not nanoparticles. This agglomeration or aggregation can also make the particles settle out or form a gel. These suspended particle clusters, settled particles, or gels cannot usually be well-dispersed in polymers.

There is a further need to modify the surface of colloidal particles with specific functional groups that interact with the polymers into which they are to be blended to improve the ability to disperse these particles throughout the host polymer without substantial agglomeration or aggregation. Better dispersion leads to fewer large particle agglomerates and aggregates and, therefore, better clarity, an important property for many product applications. Better dispersion also increases the interfacial area between particles and polymer, enhancing properties like wear-resistance and modulus. Better attachment of the particles to the polymer can increase the polymer's modulus and wear-resistance. Better dispersion can increase the viscosity and reduce the mobility of the polymer and thereby improve its resistance to creep.

Most common aminosilanes cannot be used to surface modify colloidal silica nanoparticles because they cause the nanoparticles to gel, agglomerate, or aggregate.

For example, 3-(aminopropyl)triethoxysilane ("APTES"), 4-(aminobutyl)triethoxysilane, and other primary aminoalkylsilanes have been used to surface-modify silica particles, where the particle size is 166 nm. 3-(Aminopropyl)triethoxysilane has been used to surface-modify silica gel particles of 60-125 microns in diameter. When APTES was used to lo surface-modify colloidal polypyrrole-silica particles of 113 nm in diameter, an increase in particle diameter after amination was noted, indicating some degree of flocculation. It has also been found that aminosilane modification of 100 nm colloidal silica using APTES causes flocculation, but that diethoxymethyl(aminopropyl)silane and monoethoxydimethyl(aminopropyl)silane give stable dispersions with no increase in particle size. Trialkoxysilanes are preferred over dialkoxyalkylsilanes and alkoxydialkylsilanes for surface modification because they react more rapidly than silanes with only one or two alkoxy groups.

Nevertheless, there remains a need for compositions comprising polymers and colloidal silica, with improved dispersion of the colloidal silica in the polymer.

SUMMARY

One aspect of this invention is a nanocomposite comprising a blend of an acrylic acid polymer and an aminosilane-modified colloidal silica, wherein the aminosilane-modified colloidal silica is prepared by contacting colloidal silica with an aminosilane of Formula 1:

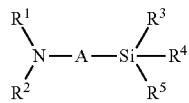

Formula 1 wherein $R^1$ and $R^2$ are independently selected from the group consisting of H, $C_1$-$C_{10}$ alkyl, $C_3$-$C_{10}$ alkenyl, and $C_6$-$C_{10}$ aryl;

A is a linker group selected from the group consisting of $C_1$-$C_{20}$ alkylene, arylene, and arylalkylene; and $R^3$ is a $C_1$-$C_{10}$ alkoxy group; and $R^4$ and $R^5$ are independently selected from the group consisting of $C_1$-$C_{10}$ alkyl and $C_1$-$C_{10}$ alkoxy groups, provided that if $R^1$ and $R^2$ are H, A is phenylene.

Another aspect of the invention is an article comprising this composition.

DETAILED DESCRIPTION

Described herein are compositions comprising blends of acrylic acid polymers and/or ethylene acrylic acid copolymers and colloidal silica modified with aminosilanes of Formula 1.

It has been found that the use of aromatic aminosilanes, aromatic aminoalkylsilanes, alkenyl aminoalkylsilanes, and secondary and tertiary aliphatic aminosilanes that do not bear additional hydroxyl functionality allows one to surface-modify nanoparticle colloidal silica without causing the silica nanoparticles to gel, agglomerate, or aggregate. These aminosilanes can be used in conjunction with other silane surface modifiers like phenylsilanes and trimethylsilyl group capping agents such as 1,1,1,3,3,3-hexamethyldisilazane.

It has also been found that nanocomposites can be prepared from carboxylic acid-containing polymers with aminosilane-modified silica nanoparticles. The nanocomposites typically exhibit an increase in crystallization temperature and improved properties such loss modulus, storage modulus, creep resistance, and wear resistance, without sacrificing optical clarity. Clarity would be sacrificed if the nanopartcles were agglomerated or if composites were prepared from particles that are larger than nanoparticles.

Colloidal silica nanoparticle dispersions are commercially available as either an aqueous dispersion or as a dispersion in an organic solvent. The dispersions can also be prepared by methods known in the art. The colloidal silica nanoparticles typically have an average particle size of less than 75 nm, or less than 50 nm. Suitable dispersions comprise about 1 to s about 70 wt %, or about 5 to about 50 wt %, or about 7 to about 30 wt % of colloidal silica nanoparticles, the balance being predominantly the aqueous or organic medium of the dispersion. Suitable organic solvents include alcohols (e.g., isopropanol, methanol), amides (e.g., dimethylacetamide, dimethylformamide) and ketones (e.g., 2-butanone).

Suitable aminosilanes include aminosilanes of Formula 1

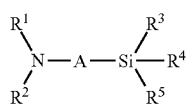

Formula 1 wherein
$R^1$ and $R^2$ are independently selected from the group consisting of H, $C_1$-$C_{10}$ alkyl, $C_3$-$C_{10}$ alkenyl, and $C_6$-$C_{10}$ aryl;
A is a linker group selected from the group consisting of $C_1$-$C_{20}$ alkylene, $C_6$-$C_{20}$ arylene, and $C_7$-$C_{20}$ arylalkylene; and
$R^3$ is a $C_1$-$C_{10}$ alkoxy group;
$R^4$ and $R^5$ are independently selected from the group consisting of $C_1$-$C_{10}$ alkyl and $C_1$-$C_{10}$ alkoxy groups, provided that if $R^1$ and $R^2$ are H, A is phenylene.

Specific examples of suitable aminosilanes include p-aminophenyltrimethoxysilane, p-aminophenyltriethoxysilane, N-phenylaminopropyltrimethoxysilane, N-phenylaminopropyltriethoxysilane, n-butylaminopropyltrimethoxysilane, n-butylaminopropyltriethoxysilane, 3-(N-allylamino)propyltrimethoxysilane, (N,N-diethyl-3-aminopropyl)trimethoxysilane, and (N,N-diethyl-3-aminopropyl)triethoxysilane.

Aminosilanes of Formula 1 can be obtained from commercial sources or prepared by methods known in the art.

To prepare the surface-modified silica nanoparticles, an aminosilane is typically added to the colloidal silica nanoparticle dispersion in a molar amount equal to about 30% to about 50% of the accessible silanol groups estimated to be on the surface of the nanoparticles. Thus, the aminosilane is typically added at a level of about 1.5 to about 4 molecules per square nanometer of silica surface area. The silica surface area can be determined by the BET (Brunauer, Emmet, Teller) method, for example using an adaptation of ASTM D1993-03(2008) "Standard Test Method for Precipitated Silica-Surface Area by Multipoint BET Nitrogen Adsorption."

In some embodiments, the reaction mixture further comprises one or more other aminosilanes of Formula 1. In some embodiments, the reaction mixture comprises one or more other silanes. Suitable other silanes should not cause the colloidal silica nanoparticles to gel, agglomerate, or aggregate. Suitable other silanes include phenyltrimethoxysilane and octyltrimethoxysilane.

In some embodiments, the process further comprises adding a trimethylsilyl group capping agent such as 1,1,1,3,3,3-hexamethyldisilazane (HMDS) to the reaction mixture. Such capping agents react with accessible silanol groups on the silica surface that have not been modified by the aminosilanes and the optional other silanes. The capping agents are therefore most conveniently added after the reaction with the aminosilanes has been carried out. The capping agent can be added at a level that is equivalent to the number of silanol groups that have not been modified by the silanes. Excess capping agent can also be used if it is volatile, and excess unreacted capping agent can be driven out of the reaction mixture by evaporation or distillation. Alternatively, excess capping agent can be left in the reaction mixture containing the aminosilane-modified silica nanoparticles and removed in later processing steps, e.g., during the preparation of nanocomposites, when the silica nanoparticles are combined with a polymer.

Use of capping agents allows one to fine-tune the amount of amine functionality, while still covering the surface with silanes to block accessible Si—OH groups that can cause particle aggregation. For example, $Me_3Si$ capping (via HMDS) removes essentially all accessible Si—OH sites that might cause particle aggregation. This can make it possible to dry the particles, and then redisperse them in a solvent to their original, small nanoparticle size, with few agglomerates or aggregates.

HMDS and silanes such as trimethylmethoxysilane, phenyldimethylmethoxysilane and octyldimethylmethoxysilane can be used as capping agents and can be obtained from commercial sources.

In some embodiments, the process further comprises heating the reaction mixture. For example, the aminosilane can be added to the colloidal silica nanoparticles with agitation, followed by heating the mixture to the desired temperature, e.g., the boiling point of the solvent. The heating can be continued until a substantial portion of the aminosilane has been reacted with the silica. The heating can be continuous or is discontinuous. Typical total heating times can be from about 0.1 hour to 100 hours, or about 1 to 48 hours, or about 2 to 24 hours.

In some embodiments, the reaction mixture further comprises a catalyst or a reaction accelerator, allowing the reaction to be run at a lower temperature and/or for a shorter time. For example, it has been found that although aromatic aminosilanes will surface-modify colloidal silica with nanoparticles without causing the silica nanoparticles to gel, agglomerate, or aggregate, the reactions can be very slow.

It has been found that certain amines ("amine promoters") can accelerate the surface modification of colloidal silica, without causing the the silica nanoparticles to gel, agglomerate, or aggregate.

Amine promoters typically have a $pK_b$ less than about 7.0, or less than about 6.0, or less than about 5.0. For example, ethylamine, ethanolamine, propylamine (all isomers), butylamine (all isomers), hexylamine (all isomers), and decylamine (all isomers) each have a $pK_b$ of about 3.2-3.4, and the $pK_b$ of benzylamine is 4.7, These amines can serve as amine promoters.

Amine promoters typically have the structure $NR_3$, where each R is independently selected from the group of H, $C_1$-$C_{16}$ alkyl and substituted $C_1$-$C_{16}$ alkyl, provided that the total number of carbons is at least two. Suitable substituents include ether, hydroxyl and aryl groups. In some embodiments, R is ethyl, isopropyl, n-propyl, n-butyl, isobutyl, cyclohexyl, 2-ethoxyethyl, 2-methoxyethyl, 2-hydroxyethyl or benzyl.

Aliphatic amine promoters include primary alkyl amines (i.e, $NH_2R$, where R is alkyl), secondary alkyl amines (i.e., $NHR_2$, where R is alkyl), tertiary alkyl amines (i.e., $NR_3$, where R is alkyl) and arylalkylamines (e.g., phenylethyl, phenylpropyl, phenyl butyl), optionally substituted with ether, hydroxyl or polyether groups. In some embodiments, the amine promoter has a boiling point between 20-100° C. In some embodiments, the amine promoter is volatile enough to be easily removed from the colloid or from the polymer-silica nanocomposites at room temperature or with moderate heat, and generally has a boiling point of about 100° C. or below. In some embodiments, the amine promoter has a boiling point above 100° C.

The molar ratio of the amine promoter to silane surface-modifier is typically about 1:100 to about 3:1, or about 5:100 to 1:1.

In some embodiments, the process further comprises an ultrasonic treatment step in which ultrasonic energy is delivered by an ultrasonic bath, probe, or other suitable source to break up any loose dusters or agglomerates of nanoparticles that may have formed during the surface modification process.

In some embodiments, the process further comprises isolating the aminosilane-modified silica nanoparticles by evaporating water or the organic advent at room temperature or by using gentle heating. More severe heating may cause the nanoparticles to agglomerate or aggregate. In some embodiments, removal of water or organic advent is carried out at reduced pressure.

In some embodiments, the process further comprises washing the aminosilane-modified silica nanoparticles with a advent selected from the group consisting of alcohols, aromatic solvents, ethers, and combinations thereof.

The aminosilane-modified silica can be added to a suitable polymer to produce nanocomposites with enhanced properties such as improved wear-resistance, creep, and modulus, when compared with the unmodified polymer. At very low levels, the colloidal silica may reduce the melt viscosity of the polymer, which improves productivity and can be of considerable commercial importance.

Suitable acrylic polymers for preparation of the nanocomposites of the claimed invention include polymers of methacrylic acid and/or acrylic acid. Together, the methacrylic acid and acrylic acid can be present at about 3 wt % to about 25 wt % of the polymer. The acid groups can be partly ionized by cations such as sodium, potassium, zinc, lithium, and/or magnesium. The degree of ionization of the carboxylic groups can range from about 0% to about 100% of the polymer, or from about 20% to about 80%, or from about 40% to about 70%. When in partly or fully ionized form, the polymers are called ionomers. The polymers, and especially the ionomers, can be blended with fatty acids (e.g., oleic, stearic, linoleic or linolenic acids) at a level of about 10% to about 100 wt % of the polymer.

In some embodiments, the acrylic polymer is a copolymer derived from the copolymerization of ethylene and monomers selected from the group consisting of acrylic acid and methacrylic acid, and optionally arylalkyl acrylates, arylalkyl methacrylates, acrylonitrile, alkyl acrylates (e.g., n-butyl acrylate, isopropyl acrylate, n-propyl acrylate, ethyl acrylate, methyl acrylate, or 2-ethylhexyl acrylate), alkyl methacrylates (e.g., methyl methacrylate), or carbon monoxide.

In some embodiments, the acrylic polymer is a copolymer derived from the copolymerization of monomers selected from the group consisting of: a) acrylic acid and methacrylic acid and b) arylalkyl acrylates, arylalkyl methacrylates, alkyl acrylates (e.g., n-butyl acrylate, isopropyl acrylate, n-propyl acrylate, ethyl acrylate, methyl acrylate, or 2-ethylhexyl acrylate), alkyl methacrylates (e.g., methyl methacrylate) and optionally c) acrylonitrile, ethylene, and carbon monoxide.

Examples of suitable polymers include Nucrel® ethylene copolymers. Surlyn® ionomers, and SentryGlas® glass interlayers, all of which are available from E. I. du Pont de Nemours and Company, Wilmington, Del.

The aminosilane-modified colloidal silica can be mixed with a polymer in a compatible solvent (a solution-blending process). In this process, the aminosilane-modified colloidal silica and the polymer are in the same solvent, or are in solvents that are miscible with each other. This process can provide nanocomposites in which the silica particles are well-dispersed within the polymer after removal of the solvent, without formation of a substantial number of agglomerates or aggregates of silica particles in the polymer.

In some embodiments, the initially formed nanocomposite is melt-processed with shear to improve the distribution and dispersion of the particles. The melt-processing can he carried in any of a number of polymer melt-mixing devices, including a Brabender PlastiCorder®, twin- or single-screw extruder, a Farrell mixer, an Atlantic mixer, a Sigma mixer, a Banbury mixer, or a 2-roll mill. In some embodiments, the particle-polymer composite is used as a masterbatch and diluted with additional polymer and then melt-mixed to obtain a nanocomposite with well-distributed and well-dispersed particles.

In one embodiment, the colloidal silica is suspended in a solvent or solvent mixture. The colloidal silica can be provided in one solvent (e.g., 2-propanol) and then diluted with additional solvents (e.g., tetrahydrofuran or 2-butanone). The polymer can be added to the colloid or diluted colloid mixture, followed by heating the mixture to swell or dissolve the polymer. Cooling the mixture can create a highly solvent-swollen polymer-nanoparticle gel, and the residual solvent, if any, can optionally be removed from the gel by evaporation, optionally with heat or vacuum, The dried nanocomposite can be used as-is, or can be melt-processed to homogenize the product, optionally with additional, nanoparticle-free polymer. Typically, the polymer contains carboxylic acid groups that are not substantially ionized with metal cations. However, in some embodiments, a substantial portion (e.g., about 20-80%) of the carboxylic acid groups of the polymer are ionized with metal cations.

In some embodiments, the polymer is added directly to the colloidal silica in solvent. It can also be added to solvent or solvent combinations that do not contain the colloid and are the same composition as the solvent(s) in which the colloidal silica is suspended. The polymer-solvent mixture can be heated to dissolve or swell the polymer and the heated mixture can be combined with the colloidal silica that is already dispersed in a solvent or solvent combination of the same chemical composition. The colloidal suspension is preferably heated to about the same temperature as the polymer mixture preferably heated to about the same temperature as the polymer mixture.

In one embodiment, the aminosilane-modified silica is added to the polymer in a solvent or solvent combination that swells the polymer, but does not dissolve it. After removal of solvent, the resulting composite and optional additional particle-free polymer can be melt-processed with shear, to make a nanocomposite with well-distributed and well-dispersed particles.

Solvent processing of the particles and the polymer is typically done above room temperature if the polymer resists swelling or dissolution at room temperature. For semi-crystalline ethylene copolymers like Nucrel® ethylene-methacrylic acid copolymers and Surlyn® ionomers, the temperature is typically from about 60° C. to about 140° C., but can be as high as about 250° C. These polymers typically are swollen or dissolved at temperatures above about 60° C. If cooled to room temperature, they remain swollen gels.

Nucrel® is more readily dissolved than ionomers like Surlyn® because it does not contain ionic domains that act like crosslinks. Those solvents that dissolve Nucrel® will often swell Surlyn®. 2-Propanol swells, but does not dissolve, Nucrel®, even at elevated temperatures (i.e., above about 60° C.). Solvents that dissolve Nucrel® at elevated temperatures include toluene and xylene. Solvent combinations that dissolve Nucrel® at reflux include a 25/75 (w/w) mixture of 2-propanol and toluene and 20/80 through 15/85 (w/w) mixtures of 2-propanol and tetrahydrofuran. Once dissolved or swollen at elevated temperature, the Nucrel®-solvent mixture remains a swollen gel when cooled to room temperature. Surlyn® can be dissolved in a solvent mixture comprising xylene, n-butanol, and propylene carbonate, e.g., 75% xylene/15% n-butanol/10% propylene carbonate.

For non-crystalline polymers, various solvents can be used to swell or dissolve the polymers. Typical solvents that can be used to swell or dissolve the polymers include tetrahydrofuran, 2-butanone, toluene, xylenes, benzene, N,N-dimethyl formamide, N,N-dimethyl acetamide, acetone, methylene chloride, chloroform, and mixtures thereof.

Polymers in which the carboxylic acid groups are partly or completely ionized, are more likely to swell in a given solvent or solvent combination, instead of dissolving, because the ionic clusters act like (pseudo)crosslinks. Dissolution may occur in solvents that contain highly polar components (e.g., methylene chloride-ethanol and tetrahydrofuran-water mixtures) that dissociate the ionic clusters by hydrogen-bonding.

Suitable polymer/solvent ratios are from about 1% to about 70% (w/w), or 5% to about 50%, or about 10% to about 25%. The ratio of silica to polymer in the composite product is typically about 0.1% to about 70 wt % (w/w), or 0.1% to about 25%, or about 0.1% to about 15%.

In some embodiments, the nanocomposite is prepared with a polymer that is in its carboxylic acid form, i.e., essentially not ionized. The corresponding ionomer can be produced by ionizing some or all of the carboxylic acid groups with metal cations after the nanocomposite is formed.

Alternatively, the nanocomposite can be prepared with a polymer in which the carboxylic acid groups have been partly ionized with metal cations, and can be further ionized with additional metal cations after the nanocomposite is formed.

In some embodiments, the nanocomposite is prepared by forming an initial nanocomposite with a polymer of ethylene, methacrylic acid or acrylic acid, and optional comonomers, in which the carboxylic groups are not ionized, and blending the initial nanocomposite with a copolymer of ethylene, methacrylic acid or acrylic acid, and optional comonomers, in which the carboxylic groups are partly ionized with metal cations, and/or copolymer in which the carboxylic acid groups are not ionized.

Alternatively, the silica nanocomposite can be prepared by forming an initial nanocomposite with a polymer of ethylene, methacrylic acid or acrylic acid, and optional comonorners, in which 20-100% of the carboxylic groups are ionized, and blending the initial nanocomposite with a copolymer of ethylene, methacrylic acid or acrylic acid, and optional comonomers, in which the carboxylic are not ionized with metal cations, and/or a copolymer in which the carboxylic acid groups are partly ionized. In this manner, a number of nanocomposite compositions can be prepared from a single silica nanocomposite precursor, with different levels of ionization of the carboxylic acid groups and different combinations of metal cations.

In some embodiments, the aminosilane-modified colloidal silica particles are isolated from the solvent, dried, and added to the copolymer directly by a melt-blending process. In such a process, the particles are added to the molten copolymer in a suitable polymer melt-mixing device.

The nanocomposites of the claimed invention can be formed into a variety of shapes, including freestanding or supported films, sheets, bottles, particles, molded articles, interlayers in glass laminates, pellets, filaments, and fibers.

In some embodiments, the aminosilane-modified colloidal silica particles are deposited on the surface of polymeric article (e.g., a polymer film, sheet, molded article, pellet or fiber). Upon heating (e.g., to the softening point of the polymer), the aminosilane-modified colloidal silica particles sink into the polymer and become partially or completely submerged in the polymer. Alternatively, the polymer can be swollen with an appropriate solvent, allowing the aminosilane-modified colloidal silica particles to sink into the polymer.

In some embodiments, the particles are evenly distributed throughout the article. In some embodiments the particles are not uniformly distributed, and are present either as a gradient in concentration from one area to another, where particles reside preferentially away from the surface, or where the particles reside entirely near or at the surface.

Surlyn® can be used as a photovoltaic device encapsulant and or in cosmetic bottle caps. The aminosilane-modified colloidal silica nanoparticles of this invention can impart additional creep-resistance to Surlyn® in these applications. The aminosilane-modified colloidal silica nanoparticles can also improve the wear-resistance of Surlyn®, making it even more attractive in floor tile coating and floor-polishing compositions. The clarity of Surlyn® makes it attractive for use as a photovoltaic device encapsulant and for use in cosmetic bottle caps and for use as interlayers in glass laminates.

EXAMPLES

General:
Colloidal silica was obtained from Nissan Chemical (Organosol® IPA-ST-MS, 30 wt % $SiO_2$ (17-23 nm diameter) in isopropyl alcohol). n-Propylamine (MW=59.1,bp 48° C., 98%, #109819); 1,1,1,3,3,3-Hexamethyl disilazane (99.9%, #379212, bp=125° C., spgr=0.774, FW=161.4)

were obtained from Aldrich (St. Louis, Mo.). The following aminosilanes were supplied by Gelest (Morrisville, Pa.):

p-aminophenyltrimethoxysilane (MW=213.3, #SIA0599.1, 90%)

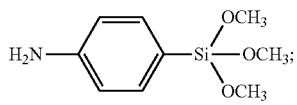

n-butylaminopropyltrimethoxysilane (MW=235.4, #SIB1932.2, d=0.947)

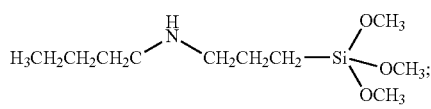

and
N-phenylaminopropyltrimethoxysilane (MW=255.38, #SIP6724,0, 95% d=1.07)

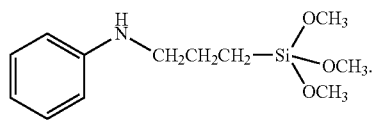

Dynamic light scattering was carried out with either a Zetasizer Nano-S (Malvern Instruments) or a Brookhaven Instruments BI9000.

Examples 1-4

Preparation and Analysis of Nanocomposites of Nucrel® and Colloidal Silica

These examples describe the preparation of ethylene-methacrylic to acid copolymer nanocomposites using unmodified or aminosilane-modified colloidal silica particles. These examples also demonstrate that the particles have a measurable beneficial effect on the polymer and that the aminosilane-modified colloidal particles in some instances have a larger effect on polymer properties than the unmodified colloidal $SiO_2$.

A 25.0-g portion of colloidal silica, 30 wt % in IPA, was added to a 250 ml, 3-neck round-bottomed flask, and diluted with isopropyl alcohol (50 g) and water (0.3 g). A stirring bar was added to the flask and a water-cooled condenser attached with a drying tube atop it. Rapid stirring was begun at room temperature. p-Aminophenyltrimethoxysilane (0.64 g) was added via needle and syringe at room temperature to the flask, making the mixture hazy in appearance. The mixture was heated and remained hazy, without a viscosity increase. Over a 3-day period, the mixture was held at reflux for 20 hr, then cooled to room temperature.

Two solvent stock solutions were prepared from isopropanol (IPA) and tetrahydrofuran (THF) in the weight ratios, 19/81 and 16/84. Pellets of Nucrel® 960 (a copolymer of ethylene and methacrylic acid, available from E. I. du Pont de Nemours and Company, Wilmington, Del.) were preweighed according to the amounts given in Table 1. Colloidal $SiO_2$ in IPA and solvent stock solution in the amounts indicated in Table 1 were added to each of four tared round-bottom flasks. The added solvent did not cause the colloid to become cloudy in appearance. This suggests that the particles were not agglomerated by the solvent, because an increase in particle size would have increased the scattering of light.

As soon as the colloids and solvents were mixed, the amounts of Nucrel® 960 specified in Table 1 were added to each flask and the flasks were heated to reflux with stirring. After the flasks were held at reflux for 2 hr, they were allowed to cool for 2 hr at room temperature. Examples 3 and 4 were thoroughly dissolved at reflux, while Examples 1 and 2 became highly swollen. After cooling to room temperature, all four examples yielded highly-swollen gels. Examples 1 and 2 retained the shape of the starting polymer pellets, although highly swollen, along with a small amount of residual liquid that was removed by pipette. Examples 3 and 4 had become monolithic gels, with little or no residual liquid. Where present, the residual liquid was removed by pipette. The solid products were removed from the flasks and allowed to dry in a fume hood over a 6-day period to collapse the gels into $SiO_2$-polymer composites. The air-dried solids were then placed into a 50° C. vacuum oven with a nitrogen bleed overnight. The dried solids and dried residual liquids were weighed, and the results recorded in Table 1.

TABLE 1

Preparation of Examples 1-4

| | Examples | | | |
|---|---|---|---|---|
| | 1 | 2 | 3 | 4 |
| Colloidal silica, 30 wt % in IPA, g | 3.0 | — | 1.0 | — |
| p-aminophenylsilane-modifed $SiO_2$ in IPA (~10 wt % $SiO_2$), g | — | 7.2 | — | 3.0 |
| Isopropanol, g | 27.0 | 16.8 | — | — |
| Stock solution, 19/81 (w/w) IPA/THF, g* | — | — | 59.0 | — |
| Stock solution, 16/84 (w/w) IPA/THF, g* | — | — | — | 57.0 |
| Nucrel ® 960, g | 10.0 | 8.0 | 10.0 | 10.0 |
| Wt dried solids, g | 10.13 | 8.13 | 10.46 | 10.57 |
| Wt solids from supernatant liquid, g | 0.85 | 0.74 | — | — |

*Stock solutions designed to make 20/80 IPA/THF mixtures when colloidal $SiO_2$ is added Dried pellets from Examples 1 and 2 and pieces of the dried monolithic gel from Examples 3 and 4 were submitted for differential scanning calorimetry (DSC) and transmission electron microscopy (TEM) analysis. For dynamic mechanical analysis (DMA), 1.0-g pieces of each composition were pressed for 1 min at 100° C. and 15 tons of force in a Pasadena press between Kapton films and backed with thin aluminum sheets. The samples were quenched hot from the press on dry ice, affording thin, fairly uniform films. In addition, untreated Nucrel® 960 was provided as a control sample; for DMA analysis, it was pressed into a film under identical conditions.

The method used in the DMA analysis was to equilibrate at −140.00° C. and then ramp up the temperature at 3.00° C./min to 80.50° C., under nitrogen at the selected frequencies with an oscillating amplitude of 10 microns and auto-tension of 125%. The method used in the DSC analysis was to equilibrate at −50.00° C., heat isothermally for 5.00 min, ramp up at 10.00° C./min to 50,00° C., hold isothermal for 5.00 min, ramp up at 10.00° C./min to 170.00° C., hold isothermal for 5.00 min, ramp down at 10.00° C./min to −50.00° C., hold isothermal for 5.00 min and repeat the ramp up to 170.00° C., all performed under nitrogen.

In the TEM analysis of Examples 1 and 2, wherein the Nucrel® was swollen, but not dissolved by the hot solvent, the $SiO_2$ particles were predominantly found at or near the surface of the polymer. In the TEM analysis of Examples 3 and 4, in which the Nucrel® was dissolved by the hot solvent, the $SiO_2$ particles were found distributed throughout the polymer.

In the DMA analysis, the loss modulus was elevated by the presence of the $SiO_2$ particles in comparison with the Nucrel® 960 control at the 100 Hz measurement frequency at −20° C., 60° C., and 70° C. The loss modulus was more elevated in the examples in which the particles were modified by p-aminophenylsilane, as compared with unmodified particles. The loss modulus was also more elevated in the examples prepared with full dissolution of the polymer and more even distribution of the particles. The glass transition temperature, $T_g$, was reduced at all measurement frequencies, in comparison with the Nucrel® 960 control, in Examples 3 and 4, which were prepared with full dissolution of the polymer and had a more even distribution of the particles (compared to Examples 1 and 2).

In the DSC analysis, the crystallization temperature ($T_C$) during the cooling cycle was elevated in all examples containing $SiO_2$ particles, in comparison with that of the Nucrel® 960 control. A higher $T_C$ can provide an economic benefit to the polymers by speeding up the molding cycle for articles made from them.

TABLE 2

Analytical data for Examples 1-4

| | Nucrel® 960 | 1 | 2 | 3 | 4 |
|---|---|---|---|---|---|
| TEM | — | $SiO_2$ mainly at the surfaces | $SiO_2$ mainly at the surfaces | $SiO_2$ distributed though the polymer | $SiO_2$ distributed though the polymer |
| DMA 100 Hz loss modulus at −20° C., MPa | 37.27 | 37.45 | 44.93 | 41.25 | 46.92 |
| DMA 100 Hz loss modulus at 60° C., MPa | 9.324 | 10.85 | 12.26 | 12.25 | 15.32 |
| DMA 100 Hz loss modulus at 70° C., MPa | 6.991 | 8.066 | 9.564 | 8.911 | 10.13 |
| DMA $T_g$ at 1 Hz, ° C. | 16.9 | 17.3 | 17.4 | 11.2 | 14.9 |
| DMA $T_g$ at 10 Hz, ° C. | 22.2 | 22.4 | 21.8 | 18.3 | 17.1 |
| DMA $T_g$ at 100 Hz, ° C. | 27.1 | 29.4 | 27.0 | 25.5 | 23.7 |
| DSC $T_c$, ° C. | 64.8 | 65.9 | 65.8 | 65.5 | 65.5 |

Examples 5-8

Preparation and Analysis of Nanocomposites of Nucrel® and Colloidal Silica

Thin films were prepared by pressing 1.5-g quantities of the nanocomposites made in Examples 1-4 between Kapton® sheets sandwiched between thin aluminum sheets in a Pasadena press for 1 minute at 100° C. and a force of 15 tons. The film and Kapton® sandwich, without the aluminum sheets, was quenched over dry ice, with dry ice also poured over the sandwich. Each film was cigar-rolled, and then the roll was folded into four to produce a symmetrical radial flow out when re-pressed. The folded rolls were pressed again. The cigar-rolling, pressing, and quenching on dry ice cycle was repeated a total of 3 times. The films were again cigar-rolled and pressed a fourth time between spacers for 30 sec at 1000 tons, to produce a thicker film with a minimum thickness of 0.5 mm, also quenched on dry ice. The resulting films were about 0.4 mm thick.

The films were submitted for transmission electron microscopy (TEM) analysis, the results summarized in Table 3. The aminosilane-modified silica of Example 8 has the best dispersion, with fewer areas in the polymer devoid of particles.

TABLE 3

TEM results for Examples 5-8

| | 5 | 6 | 7 | 8 |
|---|---|---|---|---|
| Polymer source, example # | 1 | 2 | 3 | 4 |
| TEM results | Multi-micron-sized particles distributed though the polymer | Multi-micron-sized particles distributed though the polymer. Some evidence for some fine structures below 0.1 micron. | Break-up to smaller aggregates, most below 0.5 micron, some very small and many below 0.1 micron. | Break-up to smaller aggregates, most below 0.5 micron, some very small and many below 0.1 micron. |

Examples 9-12

Preparation and Analysis of Nanocomposites of Nucrel® and Colloidal Silica

These examples describe the preparation of ethylene-methacrylic acid copolymer nanocomposites from aminosilane-modified colloidal silica. These examples also demonstrate that the particles have a measurable beneficial effect on the polymer in storage and loss moduli, creep resistance, and wear resistance. They also show that optical clarity, as measured by haze, is best for nanocomposites with the best $SiO_2$ dispersion.

For Examples 9-11, colloidal silica was added to three 1000-ml, 3-neck round-bottomed flasks, and diluted with isopropyl alcohol as shown in Table 4. To each, a stirring bar was added and a water-cooled condenser attached with a drying tube atop it. Rapid stirring was begun at room temperature. The aminosilanes were added via needle and syringe at room temperature to the flasks, making the mixtures hazy in appearance. The mixtures were heated and remained hazy, without a viscosity increase. Over a 3-day period, the mixtures were held at reflux for 24 hours, then cooled to room temperature. Where indicated in Table 4, 1,1,1,3,3,3-hexamethyldisilazane was added, and the mixtures held at room temperature for 4 hr, then heated to reflux for 4 hr, and then cooled to room temperature, providing Examples 9-11. For Example 12, the procedure of Examples 9-11 was followed, but a 500-ml, 3-neck round-bottomed flask was used in place of the 1000-ml, 3-neck round-bottomed flask, diluting with isopropyl alcohol and treating with aminosilane and propylamine as shown in Table 4.

TABLE 4

Preparation of aminosilane-modified colloidal silica for Examples 9-12

| | Examples | | | |
|---|---|---|---|---|
| | 9 | 10 | 11 | 12 |
| Colloidal silica, 30 wt % in IPA, g | 125.0 | 125.0 | 125.0 | 25.0 |
| Isopropanol, g | 250.0 | 250.0 | 250.0 | 50.0 |
| n-Butylaminopropyltrimethoxysilane, g | 3.55 | — | 3.55 | — |
| N-Phenylaminopropyltrimethoxysilane, g | — | 3.85 | — | 0.77 |
| n-Propylamine, g | — | — | — | 0.18 |
| Hexamethyldisilazane, g | 13.0 | 13.0 | — | — |

A solvent stock solution was prepared from 35.0 g of isopropanol and 215.0 g of tetrahydrofuran. Pellets of Nucrel® 960 were pre-weighed according to Table 5, To each of four tared round-bottom flasks, was added the type and amount of colloidal silica in IPA shown in Table 5. While stirring, the solvent stock solution was quickly added to the colloids. The added solvents did not cause the colloids to become cloudy in appearance, suggesting that the particles were not agglomerated by the solvent. The four diluted colloids were bath-sonicated for 4 hr.

After mixing and sonicating the solvent-diluted colloids, the amounts of Nucrel® 960 specified in Table 5 were added to each flask and the flasks were heated to reflux with stirring. After the flasks were held at reflux under reflux condensers for 2 hr, they were allowed to cool for 2 hr at room temperature. The polymers dissolved at reflux and formed monolithic gels upon cooling, leaving no detectable free liquid. The solid products were removed from the flasks and allowed to dry in a fume hood over a 6-day period to collapse the gels into $SiO_2$-polymer composite. The air-dried solids were then placed into a 50° C. vacuum oven with a nitrogen bleed overnight. The dried solids were weighed, the results recorded in Table 5.

TABLE 5

Preparation of nanocomposites, Examples 9-12

| | Examples | | | |
|---|---|---|---|---|
| | 9 | 10 | 11 | 12 |
| n-Butylaminosilane, HMDS-modifed $SiO_2$ in IPA (~10 wt % $SiO_2$), g | 5.0 | — | — | — |
| N-Phenylaminosilane, HMDS-modifed $SiO_2$ in IPA (~10 wt % $SiO_2$), g | — | 5.0 | — | — |
| n-Butylaminosilane-modifed $SiO_2$ in IPA (~10 wt % $SiO_2$), g | — | — | 5.0 | — |
| N-Phenylaminosilane-modifed $SiO_2$ in IPA (~10 wt % $SiO_2$), g | — | — | — | 5.0 |
| Stock solution, 14/86 (w/w) IPA/THF, g* | 55.0 | 55.0 | 55.0 | 55.0 |
| Nucrel ® 960, g | 10.0 | 10.0 | 10.0 | 10.0 |
| Wt. dried solids, g | 10.42 | 10.52 | 10.34 | 10.83 |

*Stock solutions designed to make 20/80 IPA/THF mixtures when colloidal $SiO_2$ is added The dried monolithic gels were press-mixed as follows to improve their homogeneity and the distribution and dispersion of the $SiO_2$ particles. Thin films were prepared by pressing 1.5-g quantities of the nanocomposites between Kapton® sheets sandwiched between thin aluminum sheets in a Pasadena press for a 1-min pre-heat and then 1 min at 100° C. and a force of 10 tons. The film and Kapton® sandwich, without the aluminum sheets, was quenched over dry ice, with dry ice also poured over the sandwich. Each film was cigar-rolled, and then the roll folded into four to produce a symmetrical radial flow out when re-pressed. The folded rolls were pressed again. The cigar-rolling, pressing, and quenching on dry ice cycle was repeated a total 4 times. The films were again cigar-rolled and pressed a fifth time under the same conditions as above, but with the Kapton® sheets held apart by 4 spacers (each about 25 mils thick), to produce a thicker film with a minimum thickness of 0.5 mm, also quenched on dry ice. The resulting films were about 0.64 mm thick. Films from Example 9 and 11 were clearer than the other two, suggesting a better, less agglomerated dispersion of particles in the polymers of these films.

As a control for creep and DMA analysis, Nucrel® 960 (untreated) pellets were press-mixed under the same conditions.

The press-mixed samples were submitted for thermogravimetric analysis (TGA), to verify the content of noncombustible $SiO_2$ filler, DMA, and transmission electron microscopy (TEM). DMA was run with a temperature ramp of 2°/min from −140° C. to 100° C. Creep analysis was done in a DMA instrument with the following protocol: a tensile stress is applied to a film at each of 2, 4, 8 MPa (290, 480, 1160 psi) at 0° C. for 20 minutes, followed by no-stress recovery periods of 30 min at 0° C. Wear properties were determined by a nanoscratch test with an atomic force microscope, putting a progressively increasing load starting at 0 and ending at 10 mN on the film as the probe was moved along its surface. The depth of the penetration and after recovery (the "residual depth") of each sample was used as a measure of its wear. Haze of the films was measured over the 350-850 nm wavelength range, and was calculated as the ratio of the diffuse transmission to the total transmission.

TGA analysis shown in Table 6 demonstrates that the amount of $SiO_2$ in each sample is approximately the expected value. Creep measurements show that the modified silica improves the resistance to creep of the polymer, reducing the creep strain and the strain after recovery in comparison with the Nucrel® 960 control.

In the DMA analysis shown in Table 6, the loss modulus at the 1 a Hz measurement frequency at 0° C.. and 60° C. was elevated by the presence of the $SiO_2$ particles in all but one case, in comparison with the Nucrel® 960 control. The storage modulus at the 1Hz measurement frequency at 25° C. was also elevated by the presence of the $SiO_2$ particles, in comparison with the Nucrel® 960 control.

In the nanoscratch wear measurements shown in Table 6, the penetration depth and residual depth was reduced by the presence of the $SiO_2$ particles in comparison with the Nucrel® 960 control, indicating improved wear resistance.

The electron micrographs from TEM, summarized in Table 6, show that the dispersion of $SiO_2$ is improved in all these examples in comparison with the press-mixed samples prepared from $SiO_2$ that was not modified or was surface-modified with p-aminophenylsilane (Examples 5-8). In all examples (9-12), the silica was distributed throughout the polymer. The composites prepared from butylaminosilane had the most primary particles and fewest and/or smallest moderately-sized clusters and larger agglomerates. In particular, Example 9 shows excellent dispersion of primary 20-nm particles, with a few aggregates, generally below 0.1 micron. Example 10 shows 100- to 200-nm clusters of particles, a few 0.1-micron aggregates and a smaller number of primary particles. Example 11 shows excellent dispersion of primary 20-nm particles, with very few aggregates below 0.1 micron and a very small number of micron-sized aggregates. Example 12 shows a few 100-nm clusters, many 0.5- to 1-micron aggregates, and a few primary particles.

Haze measurements shown in Table 6 demonstrate that the films with the best particle dispersions, Examples 9 and 11, exhibit the least haze of the nanocomposite samples.

TABLE 6

Analytical results for Examples 9-12

| | Nucrel® 960 | Examples | | | |
| --- | --- | --- | --- | --- | --- |
| | | 9 | 10 | 11 | 12 |
| Estimated $SiO_2$/Nucrel®, assuming full colloid uptake | — | 5.0 | 5.0 | 5.0 | 5.0 |
| TGA, wt % residue @ 1000° C. | — | 4.9 | 5.6, 5.5 | 5.4 | 5.4, 5.4 |
| Creep strain at 8 MPa (%) | 3.1 | 2.0 | 1.6 | 3.4 | 2.1 |
| Creep strain after recovery (%) | 3.8 | 2.9 | 2.5 | 3.8 | 2.6 |
| DMA, 1 Hz storage modulus @ 25° C. (MPa) | 405 | 480 | 435 | 445 | 485 |
| DMA 1 Hz loss modulus at 0° C., MPa | 760.7 | 729.9 | 853.2 | 805.1 | 915.9 |
| DMA 1 Hz loss modulus at 60° C., MPa | 19.59 | 20.64 | 26.92 | 22.16 | 27.62 |
| Nanoscratch wear, penetration depth (nm) | 9500 | 8100 | 7900 | 7700 | 7850 |
| Nanoscratch wear, residual depth (nm) | 2300 | 2000 | 1800 | 1950 | 1900 |
| Haze | | 10.6 | 20.8 | 38.5 | 17.7 | 27.5 |

Examples 13-20

Preparation of Nanocomposites by Melt Mixing Nucrel® and Surlyn® in a Brabender Plasti-Corder® with Dried $SiO_2$ Modified with Aminosilanes from Examples 9-12

A 25-g portion of the aminosilane-modified colloidal silicas prepared for Examples 9-12 was dried at room temperature overnight to provide dried solid for preparation of 3% amine-modified $SiO_2$ blends in approximately 45-g batches of Nucrel® 960 and Surlyn® 8945.

For Nucrel® 960, the optimum mixing temperature ($T_{set}$) in the Brabender Plasti-Corder® PL2000 was determined by processing 43.3 g of pure Nucrel® 960 at 75 rpm and finding the temperature at which the torque was in the desired range, i.e., sufficiently high to generate enough shear to enhance mixing of the $SiO_2$ particles in the melt, but not so high as to strain the mixer motor and moving parts. A $T_{set}$ of 120° C. was chosen for Nucrel® 960.

To mix the Nucrel® 960 with the dried aminosilane-modified $SiO_2$ solids, the Brabender Plasti-Corder® was outfitted with a Type 6 mixing head and stainless steel roller blades and heated to a set temperature of 120° C. The mixing head was charged with the materials in Table 7. The contents were mixed at 75 rpm for 20 min under nitrogen blanket delivered through ram, as shown in Table 7.

TABLE 7

Composition of nanocomposites blended with Nucrel®

| | Examples | | | |
| --- | --- | --- | --- | --- |
| | 13 | 14 | 15 | 16 |
| Nucrel® 960, g | 42.0 | 42.0 | 42.0 | 42.0 |
| Aminosilane-modified $SiO_2$, g (Prepared as in Example #) | 1.3 (9) | 1.3 (10) | 1.3 (11) | 1.3 (12) |
| Mixing time @$T_{set}$ = 120° C., min. | 20 | 20 | 20 | 20 |
| Torque @$T_{set}$ = 120° C., Nm | 9.1 (start) 7.1 (end) | 10.1 (start) 7.1 (end) | 9.2 (start) 7.5 (end) | 8.7 (start) 7.5 (end) |

For Surlyn® 8945, the optimum mixing temperature ($T_{set}$) in the Brabender Plasti-Corder® PL2000 was determined by processing 43.3 g of pure Surlyn® 8945 at 75 rpm. A set temperature ($T_{set}$) of 160° C. was chosen for the feeding of Surlyn® 8945 pellets, but the $T_{set}$ was dropped to 150° C. after completing the addition of materials.

To mix the Surlyn® 8945 with the dried modified $SiO_2$ solids, the Brabender Plasti-Corder® was outfitted with a Type 6 mixing head and stainless roller blades and heated to a starting set temperature of 160° C. The mixing head was charged with the materials in Table 8, and the set temperature was then dropped to 150° C. The contents were mixed at 75 rpm for 20 min under nitrogen blanket delivered through ram, as shown in Table 8.

TABLE 8

Composition of nanocomposites blended with Surlyn ®

| | Examples | | | |
|---|---|---|---|---|
| | 17 | 18 | 19 | 20 |
| Surlyn ® 8945, g | 42.0 | 42.0 | 42.0 | 42.0 |
| Aminosilane-modified SiO$_2$, g | 1.3 | 1.3 | 1.3 | 1.3 |
| (Corresponding to Ex #) | (9) | (10) | (11) | (12) |
| Mixing time @T$_{set}$ = 150° C., min | 20 | 20 | 20 | 20 |
| Torque @T$_{set}$ = 150° C., Nm | 11.1 (start) 12.5 (end) | 12.6 (start) 13.5 (end) | 12.1 (start) 12.6 (end) | 11.9 (start) 13.2 (end) |

Each of the ten samples (Examples 13-20 and unmodified Nucrel® and Surlyn®) came out clear when molten and became hazy when cooled to room temperature. The haze at room temperature may be due to the crystals which form below the melting point and which scatter light to give a haze to the polymers and blends.

The melt-mixed samples were submitted for thermogravimetric analysis (TGA), to determine the content of noncombustible material. The samples were held isothermally for 2 min, ramped up in temperature at 10° C./min to 700° C. under nitrogen, and then ramped up in temperature at 10° C./min to 1000° C. in air.

TGA analyses indicate the presence of SiO$_2$ in each sample (Examples 13-20), but not in the control samples to which SiO$_2$ was not added. The amount of SiO$_2$ is very approximately what was fed into the mixer for the Nucrel® samples. The residues in the Surlyn® control and composites all come out high because Surlyn® contains a neutralizing agent used to turn this polymer into an ionomer, which contains a non-combustible inorganic portion.

Example 21

In the manner described in Examples 1-4 and with the same ratio of ingredients, aminophenylsilane-modified SiO$_2$ was prepared by diluting colloidal silica, 30 wt % in isopropyl alcohol (IPA), with additional IPA to about 10 wt % concentration and refluxing with p-aminophenyltrimethoxysilane. This aminophenylsilane-modified colloidal SiO$_2$ in IPA was further diluted with more IPA to about 1 wt % modified SiO$_2$, then sonicated in a bath sonicator and filtered through a 0.2 micron GHP hydrophilic polypropylene syringe filter. The precise concentration of the further-diluted colloid was determined by air- and vacuum oven-drying a portion of it. The ~1 wt % modified SiO$_2$ was diluted one more time with IPA that had been filtered through a 0.45 micron polytetrafluoroethylene (PTFE) syringe filter to a concentration of 0.0061 wt % modified SiO$_2$. Separately, a 10 wt % solution of Elvacite® 2008 (PMMA with ~1% MAA, acid number=9, obtained from Lucite International, Southampton, UK) in 2-butanone (MEK) was prepared by dissolving the polymer over a period of several hours, with magnetic stirring, in MEK that had been filtered through 0.45 micron PTFE syringe filter. Thin film substrates were produced by first spin coating the Elvacite® solution onto freshly cleaned silicon wafers and then the coated substrates were annealed for 48 hr at 150° C. The spin coating conditions were adjusted to produce films that were around 500 nm thick. To create the composite film, one drop of the particle dispersion was put on top of the supported polymer film, and a small glass plate was put on top of the liquid to form a thin layer of suspension between the polymer film and the glass cover. The solvent was allowed to evaporate leaving nanoparticles deposited on the free surface of the polymer film. After subsequent removal of the glass plate from the substrate, the samples were annealed in a vacuum oven at temperatures between 70° C. and 135° C. for 30 min. Depending on the temperature, this allowed the particles to either be partially or fully submerged into the polymer film to create a non-uniform distribution of well-dispersed particles in the polymer.

What is claimed is:

1. A nanocomposite comprising a blend of:
    a) an acrylic polymer derived from monomers selected from the group consisting of methacrylic acid and acrylic acid; and
    b) an aminosilane-modified colloidal silica, wherein the aminosilane-modified colloidal silica is prepared by contacting colloidal silica with an aminosilane of Formula 1:

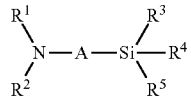

Formula 1 wherein
    $R^1$ and $R^2$ are independently selected from the group consisting of H, $C_1$-$C_{10}$ alkyl, $C_3$-$C_{10}$ alkenyl, and $C_6$-$C_{10}$ aryl;
    A is a linker group selected from the group consisting of $C_1$-$C_{20}$ alkylene, arylene, and arylalkylene; and
    $R^3$ is a $C_1$-$C_{10}$ alkoxy group; and
    $R^4$ and $R^5$ are independently selected from the group consisting of $C_1$-$C_{10}$ alkyl and $C_1$-$C_{10}$ alkoxy groups,
    provided that if $R^1$ and $R^2$ are H, A is phenylene.

2. The nanocomposite of claim 1, wherein the monomers from which the acrylic polymer is derived further comprise a further monomer selected from the group consisting of ethylene, arylalkyl acrylates, arylalkyl methacrylates, acrylonitrile, alkyl acrylates, alkyl methacrylates and carbon monoxide.

3. The nanocomposite of claim 2, wherein the acrylic polymer is partially neutralized with sodium cations, potassium cations, zinc cations, lithium cations, magnesium cations, or a combination thereof.

4. The nanocomposite of claim 1, wherein the wt/wt ratio of aminosilane-modified colloidal silica to acrylic polymer is about 0.1% to about 15%.

5. The nanocomposite of claim 2, wherein the further monomer is selected from the group consisting of n-butyl acrylate, isopropyl acrylate, n-propyl acrylate, ethyl acrylate, methyl acrylate, 2-ethylhexyl acrylate, and methyl methacrylate.

6. The nanocomposite of claim 1, further comprising fatty acids selected from the group consisting of oleic, stearic, linoleic and linolenic acids.

7. The nanocomposite of claim 1, wherein the aminosilane is selected from the group consisting of p-aminophenyltrimethoxysilane, p-aminophenyltriethoxysilane, N-phenylaminopropyitrimethoxysilane, N-phenylaminopropyitriethoxysilane, n-butylaminopropyitrimethoxysilane, n-butylarninopropyitriethoxysilane, 3-(N-allylamino)propyltrimethoxysilane, (N,N-diethyl-3-aminopropyl)trimethoxysilane, and (N,N-diethyl-3-aminopropyl)triethoxysilane.

8. An article comprising a nanocomposite of claim 1.

9. The article of claim 8 in the form of a film, a sheet, particles, or a molded article.

10. The molded article of claim 9 in the form of a cosmetic bottle cap.

11. An interlayer in a glass laminate comprising the nanocomposite of claim 1.

\* \* \* \* \*